United States Patent
Bertsch, IV et al.

(10) Patent No.: US 9,476,363 B2
(45) Date of Patent: Oct. 25, 2016

(54) ACTUATOR TO VALVE CALIBRATION OF A FUEL CONTROL VALVE ASSEMBLY

(71) Applicant: SOLAR TURBINES INCORPORATED, San Diego, CA (US)

(72) Inventors: Louis James Bertsch, IV, San Diego, CA (US); Roy Thomas Collins, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 113 days.

(21) Appl. No.: 14/592,806

(22) Filed: Jan. 8, 2015

(65) Prior Publication Data

US 2016/0201575 A1 Jul. 14, 2016

(51) Int. Cl.
- G01B 7/00 (2006.01)
- G01B 7/32 (2006.01)
- G01B 13/10 (2006.01)
- F02C 9/32 (2006.01)
- F16K 31/04 (2006.01)

(52) U.S. Cl.
CPC .............. *F02C 9/32* (2013.01); *F05D 2200/12* (2013.01); *F05D 2220/32* (2013.01); *F05D 2270/20* (2013.01); *F05D 2270/44* (2013.01)

(58) Field of Classification Search
CPC .......... F02C 9/32; G05B 2219/37333; G05B 2219/41303; F02M 2200/24
USPC .............. 251/129.04, 129.05; 702/84, 94, 95, 702/163
See application file for complete search history.

(56) References Cited

U.S. PATENT DOCUMENTS

| | | | |
|---|---|---|---|
| 5,064,031 A | 11/1991 | Kakizaki | |
| 5,950,668 A | 9/1999 | Baumann et al. | |
| 6,644,332 B1 | 11/2003 | Winkler | |
| 7,047,747 B2 * | 5/2006 | Tanaka | F02C 9/28 60/39.281 |
| 7,080,503 B2 * | 7/2006 | Griffiths | F02C 9/263 60/243 |
| 7,552,717 B2 * | 6/2009 | Dingle | F02D 41/3827 123/480 |
| 7,937,164 B2 * | 5/2011 | Samardzija | G05B 23/021 700/108 |
| 8,317,156 B2 * | 11/2012 | Singh | F02C 9/263 137/554 |
| 8,919,129 B2 * | 12/2014 | Holcomb | F02C 9/32 60/39.281 |
| 2004/0178332 A1 | 9/2004 | Ahne et al. | |
| 2007/0208488 A1 | 9/2007 | Seethaler et al. | |
| 2007/0239375 A1 * | 10/2007 | Kaushal | C23C 16/52 702/81 |
| 2010/0268440 A1 | 10/2010 | Reichinger et al. | |
| 2012/0073361 A1 * | 3/2012 | Cueto | F02M 65/001 73/114.45 |
| 2013/0000753 A1 | 1/2013 | Penning et al. | |
| 2013/0152673 A1 | 6/2013 | Young et al. | |
| 2014/0083510 A1 * | 3/2014 | Blieske | F16K 39/06 137/1 |
| 2014/0129035 A1 | 5/2014 | Marquette et al. | |

* cited by examiner

*Primary Examiner* — John K Fristoe, Jr.
*Assistant Examiner* — Seth W Mackay-Smith
(74) *Attorney, Agent, or Firm* — Procopio, Cory, Hargreaves & Savitch LLP

(57) ABSTRACT

A method for calibrating a fuel control valve assembly including a valve and an actuator is disclosed. The method includes determining an encoder offset by actuating the valve until a predetermined value for the effective flow area is measured to obtain an actual calibration encoder count and comparing the actual calibration encoder count to an initial calibration encoder count. The method also includes adjusting an alignment encoder count and a maximum encoder count by an amount of the encoder offset. The method further includes associating the adjusted alignment encoder count with an alignment command value and the adjusted maximum encoder count with a maximum command value.

20 Claims, 2 Drawing Sheets

ACTUATOR TO VALVE CALIBRATION OF A FUEL CONTROL VALVE ASSEMBLY

TECHNICAL FIELD

The present disclosure generally pertains to fuel control valve assemblies for gas turbine engines, and is more particularly directed toward a method for actuator to valve calibration of a fuel control valve assembly.

BACKGROUND

Gas turbine engines include compressor, combustor, and turbine sections. A fuel system supplies fuel to the combustor. The fuel system generally includes one or more fuel control valve assemblies that control the amount of fuel supplied to the combustor. Any misalignment between the valve and the actuator of a fuel control valve assembly may affect the operation and control of the gas turbine engine.

U.S. Pat. No. 5,950,668 to H. Bauman discloses a control assembly including a positioner/actuator and a control valve. The positioner/actuator includes a valve actuator and a positioner for controlling actuator position and speed in response to a control signal. The control valve has a characteristic flow rate as a function of time. The positioner may include an electronic control circuit for modifying the travel speed of the actuator to produce a desired flow rate as a function of time. The positioner may determine an error between a desired actuator position and an actual actuator position and apply a correction signal to reduce the error. The correction signal is asymmetric with respect to error polarity.

The present disclosure is directed toward overcoming one or more of the problems discovered by the inventors.

SUMMARY OF THE DISCLOSURE

A method for calibrating a fuel control valve assembly for a fuel system of a gas turbine engine is disclosed. The fuel control valve assembly includes a valve and an actuator with a rotary encoding device configured to receive a command signal from a control system of the fuel system. The method includes determining an encoder offset. Determining the encoder offset includes actuating the valve while a fluid is flowed through the valve and measuring an effective flow area of the valve until a predetermined value for the effective flow area is measured to locate a preselected calibration position of the valve and recording an actual calibration encoder count at the preselected calibration position. Determining the encoder offset also includes comparing the actual calibration encoder count to an initial calibration encoder count. The initial calibration encoder count is the encoder count at the preselected calibration position where the predetermined value for the effective flow area is measured in an aligned fuel control valve assembly.

The method also includes determining an actual alignment encoder count by adjusting an initial alignment encoder count by an amount of the encoder offset. The initial alignment encoder count corresponds to the encoder count at a preselected alignment position. The preselected alignment position is at a location where a value for the effective flow area is zero and is offset from a minimum position of the valve. The method further includes determining an actual maximum encoder count by adjusting an initial maximum encoder count by an amount of the encoder offset. The initial maximum encoder count corresponds to the encoder count at a maximum open position of the valve. The method yet further includes associating the actual alignment encoder count with a preselected alignment command value for the command signal and associating the actual maximum encoder count with a maximum command value for the command signal.

DETAILED DESCRIPTION

The systems and methods disclosed herein include a fuel control valve assembly with a valve and an actuator coupled to the valve, the actuator including a rotary encoding device. The valve and actuator may be misaligned when coupled together. In embodiments, the actuator to valve calibration is performed by determining an encoder count of the actuator when the valve is at a position with a predetermined effective flow area and comparing the encoder count with that of the encoder count at the same position and effective flow area for an aligned fuel control valve to obtain an encoder offset. Using the encoder offset, each endpoint of an operating range of the valve may be adjusted by the encoder offset, which may maintain the command versus effective flow area relationship at one or more of the endpoints. Maintaining the command versus effective flow area relationship for one fuel control valve to the next may allow for the control system to operate on the same logic regardless of the misalignment between the actuator and the valve since the command to effective flow area information remains constant.

Figure 1:
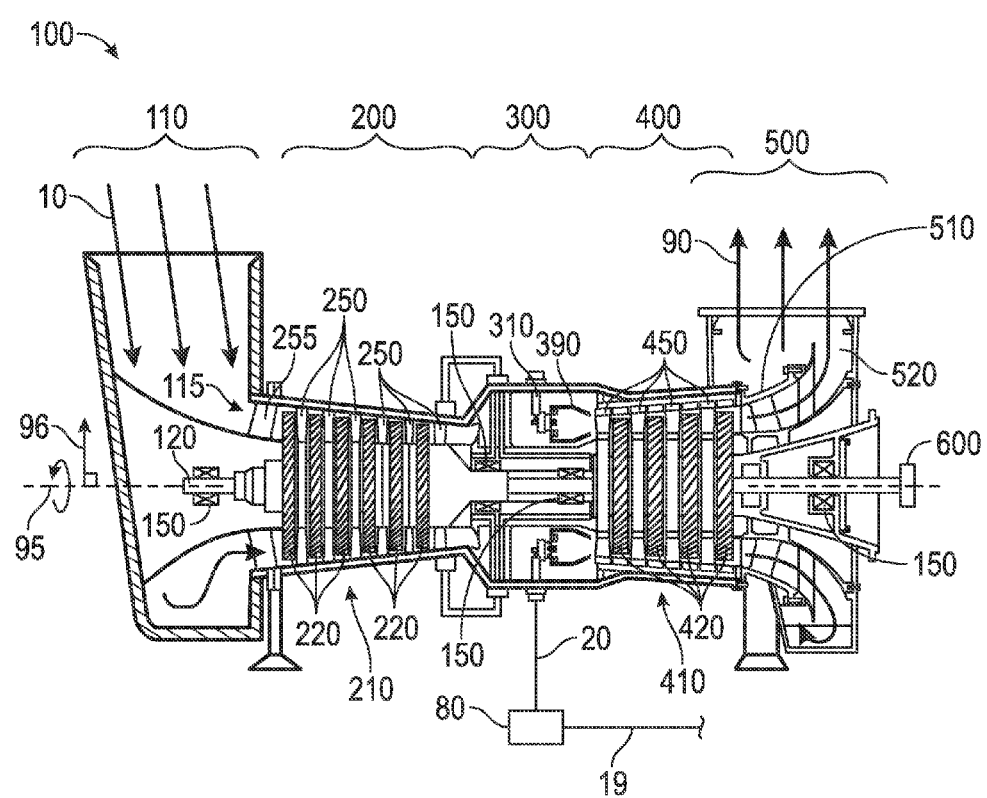
FIG. 1 is a schematic illustration of an exemplary gas turbine engine.

FIG. 1 is a schematic illustration of an exemplary gas turbine engine. Some of the surfaces have been left out or exaggerated for clarity and ease of explanation. Also, the disclosure may reference a forward and an aft direction. Generally, all references to "forward" and "aft" are associated with the flow direction of primary air (i.e., air used in the combustion process), unless specified otherwise. For example, forward is "upstream" relative to primary air flow, and aft is "downstream" relative to primary air flow.

In addition, the disclosure may generally reference a center axis 95 of rotation of the gas turbine engine, which may be generally defined by the longitudinal axis of its shaft 120 (supported by a plurality of bearing assemblies 150). The center axis 95 may be common to or shared with various other engine concentric components. All references to radial, axial, and circumferential directions and measures refer to center axis 95, unless specified otherwise, and terms such as "inner" and "outer" generally indicate a lesser or greater radial distance from, wherein a radial 96 may be in any direction perpendicular and radiating outward from center axis 95.

A gas turbine engine 100 includes an inlet 110, a shaft 120, a gas producer or compressor 200, a combustor 300, a turbine 400, an exhaust 500, and a power output coupling 600. The gas turbine engine 100 may have a single shaft or a dual shaft configuration.

The compressor 200 includes a compressor rotor assembly 210, compressor stationary vanes ("stators") 250, and inlet guide vanes 255. The compressor rotor assembly 210 mechanically couples to shaft 120. As illustrated, the compressor rotor assembly 210 is an axial flow rotor assembly. The compressor rotor assembly 210 includes one or more compressor disk assemblies 220. Each compressor disk assembly 220 includes a compressor rotor disk that is circumferentially populated with compressor rotor blades. Stators 250 axially follow each of the compressor disk assemblies 220. Each compressor disk assembly 220 paired with the adjacent stators 250 that follow the compressor disk assembly 220 is considered a compressor stage. Compressor 200 includes multiple compressor stages. Inlet guide vanes 255 axially precede the first compressor stage.

The combustor 300 includes one or more injectors 310 and includes one or more combustion chambers 390. A fuel system 80 delivers pressurized fuel to injectors 310. Fuel system 80 receives pressurized fuel from fuel supply line 19, which supplies pressurized liquid or gas fuel from a fuel source (not shown).

The turbine 400 includes a turbine rotor assembly 410, and turbine nozzles 450. The turbine rotor assembly 410 mechanically couples to the shaft 120. As illustrated, the turbine rotor assembly 410 is an axial flow rotor assembly. The turbine rotor assembly 410 includes one or more turbine disk assemblies 420. Each turbine disk assembly 420 includes a turbine disk that is circumferentially populated with turbine blades. A turbine nozzle 450 axially precedes each of the turbine disk assemblies 420. Each turbine disk assembly 420 paired with the adjacent turbine nozzle 450 that precedes the turbine disk assembly 420 is considered a turbine stage. Turbine 400 includes multiple turbine stages.

The exhaust 500 includes an exhaust diffuser 510 and an exhaust collector 520.

One or more of the above components (or their subcomponents) may be made from stainless steel and/or durable, high temperature materials known as "superalloys". A superalloy, or high-performance alloy, is an alloy that exhibits excellent mechanical strength and creep resistance at high temperatures, good surface stability, and corrosion and oxidation resistance. Superalloys may include materials such as HASTELLOY, INCONEL, WASPALOY, RENE alloys, HAYNES alloys, INCOLOY, MP98T, TMS alloys, and CMSX single crystal alloys.

Figure 2:
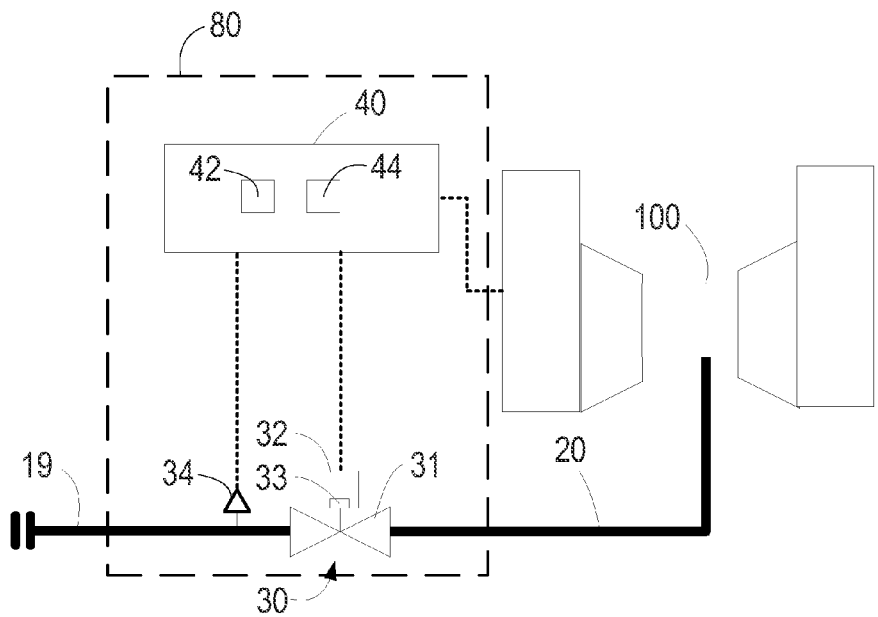
FIG. 2 is a simplified schematic diagram of the fuel system of FIG. 1 and the gas turbine engine.

FIG. 2 is a simplified schematic diagram of the fuel system 80 of FIG. 1 and the gas turbine engine 100. Pressurized gas fuel from fuel supply line 19 travels along fuel line 20. In the embodiment illustrated, fuel line 20 is a single primary fuel line. In other embodiments, fuel line 20 may split into multiple fuel lines, such as a primary fuel line and a secondary fuel line, such as a pilot fuel line. Fuel line 20 may also split into multiple fuel delivery lines. The split of fuel line 20 may be accomplished by fittings, manifolds, etc. Each fuel injector 310 (shown in FIG. 1) may be connected to a fuel delivery line. The fuel delivery line may include one or more valves, and may connect to one or more fuel injector 310 ports. Other fuel delivery lines and configurations may also be used.

Each fuel line 20 includes one or more fuel control valve assembly ("valve assembly") 30. Any number of valve assemblies 30 may be included in fuel system 80 in both series and parallel configurations. Fuel system 80 may also include a vent line that splits or tees off from fuel line 20. Vent line may include a vent valve. Block valves may be located upstream and downstream of the vent line. In some embodiments, fuel line 20 splits into a primary fuel line and a secondary fuel line after the block valve(s).

In embodiments, fuel system 80 includes one or more sensors 34 for monitoring the fuel flowing through fuel line 20. Sensors 34 may be used to monitor the fuel and the valve assembly. Sensors 34 may also be used to determine the effective flow area of the valve assembly 30. Exemplar sensors 34 include pressure, temperature, and flow sensors. The sensors 34 may be located upstream, downstream, or both upstream and downstream of a valve assembly 30.

Each valve assembly 30 may be an electric rotary valve assembly and may include a valve 31 and an actuator 32. Valve 31 may be a rotary gas fuel valve. Valve 31 may not include a physical stop limit to mechanically stop the valve in a fully open or fully closed position. Actuator 32 may be coupled to valve 31 using mounting hardware. Actuator 32 may include a return spring and a rotary encoding device 33, such as resolver or a rotary encoder. The rotary encoding device 33 may represent the angular position of the actuator 32 as an analog or digital code, such as encoder counts. The encoder counts may be equally sized subdivisions of the full 360 degrees of the rotary encoding device 33. In some embodiments, actuator 32 includes a mechanical stop which can be used as a "zero" or starting position with the encoder counts being counted from the mechanical stop.

Fuel system 80 also includes control system 40. Control system 40 may include an electronic control circuit having a central processing unit ("CPU"), such as a processor, or micro controller. Alternatively, control system 40 may include programmable logic controllers or field-programmable gate arrays. Control system 40 may also include memory for storing computer executable instructions, which may be executed by the CPU. The memory may further store data related to controlling the valve assembly 30. Control system 40 also includes inputs and outputs to receive sensor signals and send control signals. In the embodiment illustrated, control system 40 includes a data store 44 and a valve control module 42. Data store 44 includes the encoder count versus command data. Valve control module 42 is configured to control the position of valve 31 using the encoder count versus command data.

INDUSTRIAL APPLICABILITY

Gas turbine engines may be suited for any number of industrial applications such as various aspects of the oil and gas industry (including transmission, gathering, storage, withdrawal, and lifting of oil and natural gas), the power generation industry, cogeneration, aerospace, and other transportation industries.

Referring to FIG. 1, a gas (typically air 10) enters the inlet 110 as a "working fluid", and is compressed by the compressor 200. In the compressor 200, the working fluid is compressed in an annular flow path 115 by the series of compressor disk assemblies 220. In particular, the air 10 is compressed in numbered "stages", the stages being associated with each compressor disk assembly 220. For example, "4th stage air" may be associated with the 4th compressor disk assembly 220 in the downstream or "aft" direction, going from the inlet 110 towards the exhaust 500). Likewise, each turbine disk assembly 420 may be associated with a numbered stage.

Once compressed air 10 leaves the compressor 200, it enters the combustor 300, where it is diffused and fuel is added. Air 10 and fuel are injected into the combustion chamber 390 via injector 350 and combusted. Energy is extracted from the combustion reaction via the turbine 400 by each stage of the series of turbine disk assemblies 420. Exhaust gas 90 may then be diffused in exhaust diffuser 510, collected and redirected. Exhaust gas 90 exits the system via an exhaust collector 520 and may be further processed (e.g., to reduce harmful emissions, and/or to recover heat from the exhaust gas 90).

Referring to FIG. 2, during operation of gas turbine engine 100, control system 40 may calculate the required supply pressure at the valve assembly 30 to maintain turbine speed and load. Control system 40 has information regarding the fuel demand, fuel characteristics, fuel pressures, and the control valve characteristics, such as the encoder count versus command data. Control system 40 may also have information about the required flows and pressures into the gas turbine engine 100 to maintain combustion stability or to determine a set point for a desired increase in load. Control system 40 may change the position and the effective flow area of the valve 31 by communicating or transmitting a control signal or command that includes the encoder count that the actuator 32. The actuator 32 rotates to that encoder count in response to the control signal which rotates the valve 31 to the desired position.

Actuator 32 and valve 31 may be slightly misaligned when actuator 32 is coupled to valve 31. When the actuator 32 and valve 31 are misaligned the valve 31 for a given encoder count may not have the effective flow area expected for a given command signal sent by the control system 40 to the actuator 32.

Figure 3:
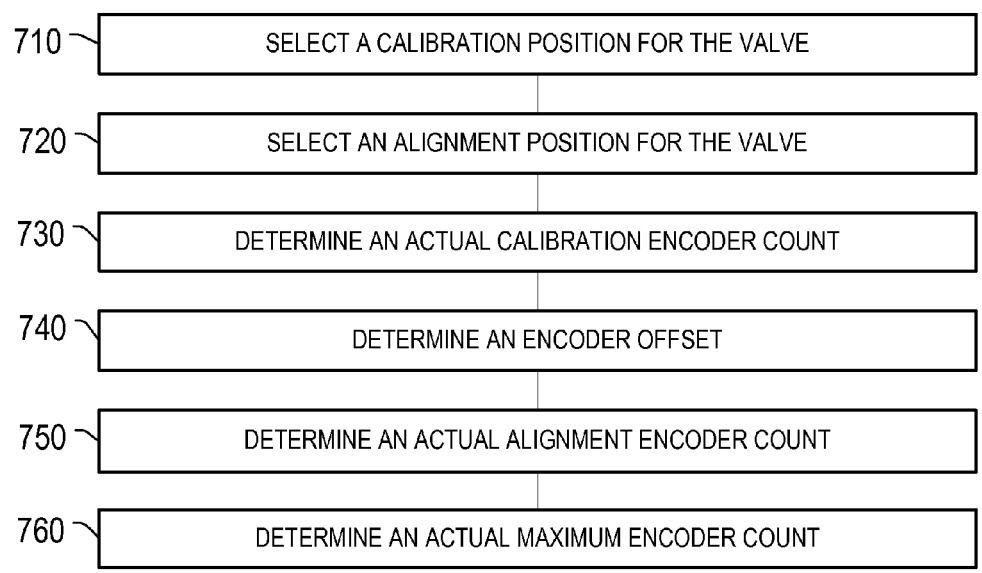
FIG. 3 is a flowchart of a method for actuator to valve calibration for the fuel control valve assembly of FIG. 2.

FIG. 3 is a flowchart of a method for actuator 32 to valve 31 calibration of the fuel control valve assembly 30 of FIG. 2. The method may include selecting a calibration position for valve 31 at step 710. Selecting the calibration position for valve 31 may only need to be performed once for a given category or family of valves 31. Selecting the calibration position for the valve 31 may thus be predetermined/preselected for the given category or family of valves 31. The preselected calibration position can then be used for calibration of each individual valve 31.

The calibration position has a corresponding calibration effective flow area, a calibration command value, and a nominal (initial) calibration encoder count. The calibration command value is the command value that corresponds to the calibration position when the valve 31 and actuator 32 are not misaligned. Similarly, the nominal calibration encoder count is the encoder count that corresponds to the calibration position when the valve 31 and actuator 32 are not misaligned. The calibration position may be selected so that the calibration effective flow area falls directly on an encoder count. The calibration position may also be selected so that the calibration encoder count, calibration command value, and the calibration effective flow area each fall on a round number, such as falling on a tenth or a hundredth decimal value.

The method may also include selecting an alignment position for the valve 31 at step 720. Selecting the alignment position for the valve 31 may only need to be performed once for a given category or family of valves 31. Selecting the alignment position for valve 31 may thus be predetermined/preselected for the given category or family of valves 31. The preselected alignment position can then be used for calibration of each individual valve 31.

The alignment position is a position where valve 31 is still closed and has an alignment effective flow area of zero. The alignment position also has a corresponding nominal (initial) alignment encoder count and an alignment command value. The alignment position may be the position of valve 31 just before the flow path in valve 31 begins to open, and may also be a position where the nominal alignment encoder count and alignment command value both fall on a round number, such as falling on a tenth or a hundredth decimal value. The alignment command value falls between the minimum command value and the maximum command value.

Steps 710 and 720 may be performed by a design engineer, a manufacturer, an operator, or may be automated by the design engineer, manufacturer or operator.

The valve 31 has a range of motion with a minimum position with a minimum encoder count and a maximum position with a maximum encoder count. Generally, the minimum command value corresponds to the minimum position and the maximum command value corresponds to the maximum position. The minimum position is closed position at one end of the range of motion of the valve 31 and the maximum position is the open position of the range of motion of the valve 31. The maximum position may also correspond to where the effective flow area of the valve 31 is the largest. Since the valve 31 may not include a physical stop, the valve 31 may be rotated past the minimum position and the maximum position. In some embodiments, valve 31 has a range of motion of 90 degrees and a 4-20 mA signal is used to control actuator 32. The minimum position in these embodiments is at 0 degrees and corresponds to 4 mA signal and may correspond to an encoder count of zero. The maximum position is at 90 degrees and corresponds to 20 mA.

A nominal (initial) maximum encoder count may be determined by dividing the range of motion of the valve 31 by 360 degrees, multiplying by the total number of counts per 360 degrees, and multiplying by the gearbox ratio. In some embodiments, the gearbox ratio is 40:1, the range of motion is 90 degrees, and the total number of counts per 360 degrees is 4095. In this embodiment the nominal maximum encoder count is 40950.

The operating range of valve 31 may be from the alignment position to the maximum position. The alignment position is offset from the minimum position. The operating range may have a corresponding encoder count range. The encoder count range may be determined by subtracting the nominal alignment encoder count from the nominal maximum encoder count.

The method includes determining an actual calibration encoder count at step 730. The calibration encoder value is the actual encoder count at the preselected calibration position of valve 31 corresponding to the calibration effective flow area. The calibration encoder value is determined by locating the preselected calibration position and recording the encoder value at the calibration position. The calibration position is located by measuring the effective flow area of valve 31 while flowing a fluid through valve 31 and comparing the measured value of the effective flow area to the preselected calibration effective flow area value. If the measured value of the effective flow area does not match the preselected calibration effective flow area value, the valve position is slowly changed/actuated so as to open or close the valve 31. This is repeated until the measured effective flow area value matches the preselected calibration effective flow area value, such as being equal to or within a predetermined tolerance of the preselected calibration effective flow area value. The predetermined tolerance is selected to ensure the precision of the calibration process. In some embodiments, the predetermined tolerance is plus or minus 0.01% of the preselected calibration effective flow area value. In some embodiments, the fluid is an incompressible liquid.

Step 730 may be performed by connecting the valve assembly 30 within a fuel system 80 or by connecting the valve assembly 30 to a testing system, such as a gas turbine engine test system or a test bench. A test bench may be set up similar to fuel system 80 described herein. The test bench may include a controller with a control module and a data store similar to control system 40 and includes one or more sensors. The sensors are used to measure the effective flow area of valve 31. The effective flow area of the valve 31 may be measured indirectly during step 730, such as by measuring flow rate with a flow meter or by calculating the flow rate using other sensors. The flow rate may then be used to determine the effective flow area of valve 31 at a given valve position.

The method also includes determining an encoder offset by comparing the actual calibration encoder count to the nominal calibration encoder count at step 740. In some embodiments, step 740 includes subtracting the actual calibration encoder count from the nominal calibration encoder count. The nominal encoder count may be preselected with the calibration position. Step 740 may be performed manually by an engineer, a manufacturer or an operator, or may be automated on a machine, such as the testing system or a separate computer.

The method further includes determining an actual alignment encoder count by adjusting the nominal alignment encoder count by the amount of the encoder offset at step 750. In some embodiments, step 750 includes subtracting the encoder offset from the nominal alignment encoder count. Step 750 may also include associating the actual alignment encoder count with the preselected alignment command value, such as by modifying the control system 40 by adjusting the command versus encoder count data located in data store 44 so that the actual alignment encoder count corresponds to the alignment command value.

The method yet further includes determining an actual maximum encoder count by adjusting the nominal maximum encoder count by the amount of the encoder offset at step 760. In some embodiments, step 760 includes subtracting the encoder offset from the nominal maximum encoder count. Step 760 may also include associating the actual maximum encoder count with the maximum command value, such as by modifying the control system 40 by adjusting the command versus encoder count data located in data store 44 so that the actual maximum encoder count corresponds to the maximum command value. When modifying the maximum encoder count based on the encoder offset the maximum position may shift angularly with the maximum encoder count. Steps 750 and 760 may be performed by manually updating the control system 40 with the actual alignment encoder count and the actual maximum encoder count or may be automated by a machine, such as the testing system or a separate computer.

It may be desirable to maintain a linear relationship between the command and effective flow area over the operating range of the valve 31. It may also be desirable to ensure that the command value for each effective flow area stays the same over the operating range of valve 31. The valve control module 42 may be configured to linearly interpolate the command value between the alignment position and the maximum position. By shifting the alignment encoder count and the maximum encoder counts to their corresponding command values, the encoder count range is maintained and the linear relationship over the operating range is maintained. By maintaining the relationship between the command and effective flow area over the operating range of the valve 31 the command versus effective flow area may be repeatable and predictable, and the valve control module 42 may be configured with a single control scheme regardless of any misalignment in the valve 31.

In some embodiments, the minimum encoder count is not shifted by the encoder offset. Changing the alignment encoder count in these embodiments also adjusts the rate of change of the valve angle vs. command for command values between the minimum command value and the alignment command value, while maintaining the rate of change of the valve angle vs. command for command values between the alignment command value and the maximum command value.

The calibration position may be selected so that the calibration effective flow area is relatively small and can be measured at a lower flow. Measuring the effective flow area at a lower flow may allow for a stable and steady flow during the measurement process. The calibration position may be closer to the minimum position than to the maximum position within the range of motion of the valve 31. In some embodiments, the calibration position is within 20 percent of the valve range of motion relative to the minimum position to limit the flow needed to measure the effective flow area. In other embodiments, the calibration position is within 15 percent of the valve range of motion relative to the minimum position to limit the flow needed to measure the effective flow area. In some embodiments, the calibration effective flow area is less than 1 percent of the maximum effective flow area of the valve 31. In other embodiments, the calibration effective flow area is less than 0.5% of the maximum effective flow area of the valve 31.

The maximum operating position of the valve 31, where the gas turbine engine 100 is operating at its full capacity is generally at a position that is less than the nominal maximum position. The maximum operating position is between 95-97 percent of the nominal maximum position. In the case of a negative offset, the actual maximum position may shift angularly passed the maximum operating position and may be less than the maximum operating position. This shift may prevent the gas turbine engine 100 from operating at its full capacity as the valve 31 cannot be opened beyond the actual maximum position to the maximum operating position. In some embodiments, when the actual maximum position is less than the maximum operating position, the alignment of the valve assembly 30 is considered out of tolerance and may not be used in gas turbine engine 100 and may be discarded.

The method may include comparing the misalignment error (the encoder offset) to a predetermined tolerance and discarding or rejecting the valve assembly 30 if the misalignment error is greater than the predetermined tolerance. The misalignment error and the predetermined tolerance may be expressed in encoder counts, degrees, or in a percentage of the operating range. In some embodiments, the predetermined tolerance is up to plus or minus 5 percent of the operating range of the valve 31. In other embodiments, the predetermined tolerance is up to plus or minus 3 percent of the operating range of the valve 31. In yet other embodiments, the predetermined tolerance is up to plus or minus 4 degrees. The comparison may be performed manually by an engineer, manufacturer or operator, or may automated by a machine, such as the testing system or a separate computer.

Those of ordinary skill in the art will appreciate that the various illustrative logical blocks, modules, controllers, units, and algorithms described in connection with the embodiments disclosed herein can often be implemented as electronic hardware, computer software, or combinations of both. To clearly illustrate this interchangeability of hardware and software, various illustrative components, units, blocks, modules, and operations have been described above generally in terms of their functionality. Whether such functionality is implemented as hardware or software depends upon the particular system and design constraints imposed on the overall system. Persons of ordinary skill in the art can implement the described functionality in varying ways for each particular system, but such implementation decisions should not be interpreted as causing a departure from the scope of the invention. In addition, the grouping of functions within a unit, module, block or operation is for ease of description. Specific functions or operations can be moved from one unit, module or block without departing from the invention. Electronic content may include, for example, but is not limited to, data and/or applications which may be accessed through the system or systems.

The various illustrative logical blocks, units, operations and modules described in connection with the example embodiments disclosed herein, may be implemented or performed with, for example, but not limited to, a processor, such as a general purpose processor, a digital signal processor ("DSP"), an application-specific integrated circuit ("ASIC"), a field programmable gate array ("FPGA") or other programmable logic devices, such as a PLC, discrete gate or transistor logic, discrete hardware components, or any combination thereof designed to perform the functions described herein. A general-purpose processor may be, for example, but not limited to, a microprocessor, but in the alternative, the processor may be any processor, controller, or microcontroller. A processor may also be implemented as a combination of computing devices, for example, but not limited to, a combination of a DSP and a microprocessor, a plurality of microprocessors, one or more microprocessors in conjunction with a DSP core, or any other such configuration.

The operations of a method or algorithm and the processes of a block or module described in connection with the example embodiments disclosed herein may be embodied directly in hardware, in a software module (or unit) executed by a processor, or in a combination of the two. A software module may reside in, for example, but not limited to, random access memory ("RAM"), flash memory, read-only memory ("ROM"), erasable programmable read only memory (EPROM), electrically erasable programmable read only memory ("EEPROM"), registers, hard disk, a removable disk, a compact disk ("CD-ROM"), or any other form of machine or non-transitory computer readable storage medium. An exemplary storage medium may be coupled to the processor such that the processor can read information from, and write information to, the storage medium. In the alternative, the storage medium may be integral to the processor. The processor and the storage medium may reside in an ASIC.

The preceding detailed description is merely exemplary in nature and is not intended to limit the invention or the application and uses of the invention. The described embodiments are not limited to use in conjunction with a particular type of valve assembly. Hence, although the present disclosure, for convenience of explanation, depicts and describes particular valve assembly, it will be appreciated that the valve assembly in accordance with this disclosure can be implemented in various other configurations, can be used with various other types of gas turbine engines, and can be used in other types of machines. Furthermore, there is no intention to be bound by any theory presented in the preceding background or detailed description. It is also understood that the illustrations may include exaggerated dimensions to better illustrate the referenced items shown, and are not consider limiting unless expressly stated as such.

What is claimed is:

1. A method for calibrating a fuel control valve assembly for a fuel system of a gas turbine engine, the fuel control valve assembly including a valve and an actuator with a rotary encoding device configured to receive a command signal from a control system of the fuel system, the method comprising:

locating a preselected calibration position by measuring an effective flow area of the valve while flowing a fluid through the valve, comparing the measured effective flow area to a preselected calibration effective flow area that corresponds to the preselected calibration position, and actuating a position of the valve if the measured effective flow area does not match the preselected calibration effective flow area until the measured effective flow area matches the preselected calibration effective flow area;

recording an encoder count of the rotary encoding device at the preselected calibration position;

determining an encoder offset by subtracting the encoder count from a preselected calibration encoder count that corresponds to the preselected calibration position for an aligned fuel control valve assembly;

determining an actual alignment encoder count by subtracting the encoder offset from an initial alignment encoder count that corresponds to a preselected alignment position for the aligned fuel control valve assembly, and associating the actual alignment encoder count with a preselected alignment command value for the command signal, the preselected alignment position being located between a minimum position of the valve and the preselected calibration position, and being at a location where the effective flow area of the valve is equal to zero; and determining an actual maximum encoder count by subtracting the encoder offset from an initial maximum encoder count, and associating the actual maximum encoder count with a maximum command value for the command signal.

2. The method of claim 1, wherein the preselected calibration position is selected at an angular position of the valve where the encoder count for the aligned fuel control valve assembly and the effective flow area are each a round number.

3. The method of claim 1, wherein the preselected alignment position is selected at an angular position of the valve where the encoder count for the aligned fuel control valve assembly and a command value are each a round number.

4. The method of claim 3, wherein the preselected alignment position is the angular position of the valve just before a flow path in the valve begins to open.

5. The method of claim 1, wherein the preselected calibration position is within 20 percent of a range of motion of the valve relative to the minimum position of the valve.

6. The method of claim 1, wherein the preselected calibration position is in the location where the effective flow area of the valve is less than 1 percent of a maximum effective flow area of the valve.

7. The method of claim 1, wherein a maximum position of the valve is shifted when associating the actual maximum encoder count with the maximum command value.

8. The method of claim 7, wherein the fuel control valve assembly is discarded if the maximum command value is shifted beyond a maximum operating position of the valve such that the maximum position is less than the maximum operating position.

9. A method for calibrating a fuel control valve assembly for a fuel system of a gas turbine engine, the fuel control valve assembly including a valve and an actuator with a rotary encoding device configured to receive a command signal from a control system of the fuel system, the method comprising:

selecting a calibration position within a range of motion of the valve, the calibration position being located closer to a minimum position of the valve than to a maximum position of the valve and having a corresponding nominal calibration encoder count and a corresponding calibration effective flow area;

selecting an alignment position offset from the minimum position, the alignment position having a corresponding nominal alignment encoder count, a corresponding alignment effective flow area of zero, and a corresponding alignment command value;

determining an actual calibration encoder count by locating the calibration position including measuring an effective flow area of the valve while flowing a fluid through the valve and actuating a position of the valve if the measured effective flow area does not match the corresponding calibration effective flow area until the measured effective flow area matches the corresponding calibration effective flow area;

determining an encoder offset by subtracting the actual calibration encoder count from the corresponding nominal calibration encoder count;

determining an actual alignment encoder count by adjusting the corresponding nominal alignment encoder count by an amount of the encoder offset and associating the actual alignment encoder count with the corresponding alignment command value; and determining an actual maximum encoder count by adjusting a nominal maximum encoder count by the amount of the encoder offset and associating the actual maximum encoder count with a maximum command value.

10. The method of claim 9, wherein a linear relationship between a command and the effective flow area over an operating range of the valve between the alignment position and the maximum position is maintained.

11. The method of claim 9, wherein selecting the calibration position includes selecting an angular position of the valve where the corresponding nominal calibration encoder count and the corresponding calibration effective flow area are each a round number.

12. The method of claim 9, wherein selecting the alignment position includes selecting an angular position of the valve where the corresponding nominal alignment encoder count and the corresponding alignment command value are each a round number.

13. The method of claim 9, wherein selecting the calibration position includes selecting an angular position of the valve that is within 20 percent of the range of motion of the valve relative to the minimum position of the valve.

14. The method of claim 9, wherein selecting the calibration position includes selecting an angular position of the valve where the corresponding calibration effective flow area is less than 1 percent of a maximum effective flow area of the valve.

15. The method of claim 9, wherein the maximum position of the valve is shifted when associating the actual maximum encoder count with the maximum command value.

16. The method of claim 9, further comprising comparing the encoder offset to a predetermined tolerance and discarding the valve assembly if the encoder offset is greater than the predetermined tolerance.

17. A method for calibrating a fuel control valve assembly for a fuel system of a gas turbine engine, the fuel control valve assembly including a valve and an actuator with a rotary encoding device configured to receive a command signal from a control system of the fuel system, the method comprising:

determining an encoder offset by actuating the valve while a fluid is flowed through the valve and measuring an effective flow area of the valve until a predetermined value for the effective flow area is measured to locate a preselected calibration position of the valve and recording an actual calibration encoder count at the preselected calibration position, and by comparing the actual calibration encoder count to an initial calibration encoder count, the initial calibration encoder count being an encoder count at the preselected calibration position where the predetermined value for the effective flow area is measured in an aligned fuel control valve assembly;

determining an actual alignment encoder count by adjusting an initial alignment encoder count by an amount of the encoder offset, the initial alignment encoder count corresponding to the encoder count at a preselected alignment position, the preselected alignment position being at a location where a value for the effective flow area is zero;

determining an actual maximum encoder count by adjusting an initial maximum encoder count by the amount of the encoder offset, the initial maximum encoder count corresponding to the encoder count at a maximum open position of the valve; and associating the actual alignment encoder count with a preselected alignment command value for the command signal and associating the actual maximum encoder count with a maximum command value for the command signal.

18. The method of claim 17, wherein the initial maximum encoder count is determined by dividing a range of motion of the valve by 360 degrees, multiplying by a total number of encoder counts per 360 degrees, and multiplying by a gearbox ratio.

19. The method of claim 17, wherein associating the actual alignment encoder count with the preselected alignment command value for the command signal and associating the actual maximum encoder count with the maximum command value for the command signal includes modifying the control system of the gas turbine engine.

20. The method of claim 17, wherein a linear relationship between a command and the effective flow area over an operating range of the valve between the alignment position and a maximum position is maintained.

* * * * *